United States Patent
Ebe (10) Patent No.: US 11,252,394 B2
(45) Date of Patent: Feb. 15, 2022

(54) LENS APPARATUS AND IMAGING APPARATUS INCLUDING THE SAME

(71) Applicant: CANON KABUSHIKI KAISHA, Tokyo (JP)

(72) Inventor: Hiroki Ebe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 16/457,265

(22) Filed: Jun. 28, 2019

(65) Prior Publication Data

US 2020/0014908 A1 Jan. 9, 2020

(30) Foreign Application Priority Data

Jul. 4, 2018 (JP) .............................. JP2018-127360

(51) Int. Cl.
| | |
|---|---|
| *G02B 13/00* | (2006.01) |
| *G02B 9/12* | (2006.01) |
| *H04N 13/229* | (2018.01) |
| *H04N 5/225* | (2006.01) |

(52) U.S. Cl.
CPC ............ *H04N 13/229* (2018.05); *G02B 9/12* (2013.01); *G02B 13/0065* (2013.01); *H04N 5/2253* (2013.01); *H04N 5/2254* (2013.01)

(58) Field of Classification Search
CPC ............ G02B 13/007; G02B 13/0065; G02B 13/0045; G02B 13/06; G02B 13/18; G02B 9/12; G03B 3/0037; G03B 17/023; G03B 17/14; G03B 17/17; G03B 30/00; G03B 35/02; G03B 35/08; G03B 35/10; H04N 13/211; H04N 13/218; H04N 13/229; H04N 13/286; H04N 5/2254; H04N 5/2253
See application file for complete search history.

(56) References Cited

U.S. PATENT DOCUMENTS

| | | | | |
|---|---|---|---|---|
| 8,878,911 | B2 * | 11/2014 | Wakazono | G03B 35/02 348/49 |
| 2011/0310231 | A1 | 12/2011 | Shinji | |
| 2013/0278731 | A1 * | 10/2013 | Inomoto | G03B 35/10 348/49 |
| 2016/0253559 | A1 * | 9/2016 | Goncharov | G02B 13/0065 348/78 |

FOREIGN PATENT DOCUMENTS

| | | |
|---|---|---|
| CN | 102520510 A | 6/2012 |
| WO | 2017218071 A | 12/2017 |

* cited by examiner

*Primary Examiner* — Mustak Choudhury
(74) *Attorney, Agent, or Firm* — Canon U.S.A., Inc. IP Division

(57) ABSTRACT

A lens apparatus includes two different optical systems. Each of the two optical systems includes a front lens unit having negative refractive power, an intermediate lens unit, and a rear lens unit disposed in this order from an object side to an image plane side. Each of the intermediate lens units in the two optical systems includes a first reflecting member for bending an optical path at a position adjacent to the front lens unit, and a second reflecting member for bending the optical path at a position adjacent to the rear lens unit. The following conditional expression is satisfied:

$$0.05 < Dout/Din < 0.50,$$

where Din is a distance between surface vertexes of lenses closest to an object in the two optical systems, and Dout is a distance between surface vertexes of lenses closest to an image plane in the two optical systems.

22 Claims, 11 Drawing Sheets

LENS APPARATUS AND IMAGING APPARATUS INCLUDING THE SAME

BACKGROUND OF THE INVENTION

Field of the Invention

The aspect of the embodiments relates to a lens apparatus which is suitable for imaging apparatuses including digital video cameras, digital still cameras, broadcasting cameras, silver-halide film cameras, and monitoring cameras.

Description of the Related Art

In order to capture an image used for contents adding a sense of realism, such as a virtual reality, an imaging apparatus capable of wide-angle stereoscopic image capturing is demanded.

United States Patent Application Publication No. 2011/0310231 discusses an imaging apparatus configured to enable stereoscopic image capturing by forming optical images by using two different optical systems, on one image sensor.

However, in the configuration discussed in United States Patent Application Publication No. 2011/0310231, the two coaxial optical systems are disposed side by side on the image sensor, resulting in a short distance between the optical axes of the two optical systems. To enlarge the base length in the configuration discussed in United States Patent Application Publication No. 2011/0310231 intending to capture a more natural stereoscopic image (video image), the size of the apparatus together with the image sensor is to be increased.

SUMMARY OF THE INVENTION

According to an aspect of the embodiments, a lens apparatus includes two different optical systems. Each of the two optical systems includes a front lens unit having negative refractive power, an intermediate lens unit, and a rear lens unit disposed in this order from an object side to an image plane side. Each of the intermediate lens units in the two optical systems includes a first reflecting member for bending an optical path at a position adjacent to the front lens unit, and a second reflecting member for bending the optical path at a position adjacent to the rear lens unit. The following conditional expression is satisfied:

$$0.05 < Dout/Din < 0.50,$$

where Din is a distance between surface vertexes of lenses closest to an object in the two optical systems, and Dout is a distance between surface vertexes of lenses closest to an image plane in the two optical systems.

Further features of the disclosure will become apparent from the following description of exemplary embodiments with reference to the attached drawings.

DESCRIPTION OF THE EMBODIMENTS

Exemplary embodiments of a lens apparatus and an imaging apparatus including the lens apparatus according to the disclosure will be described below with reference to the accompanying drawings.

Figure 1:
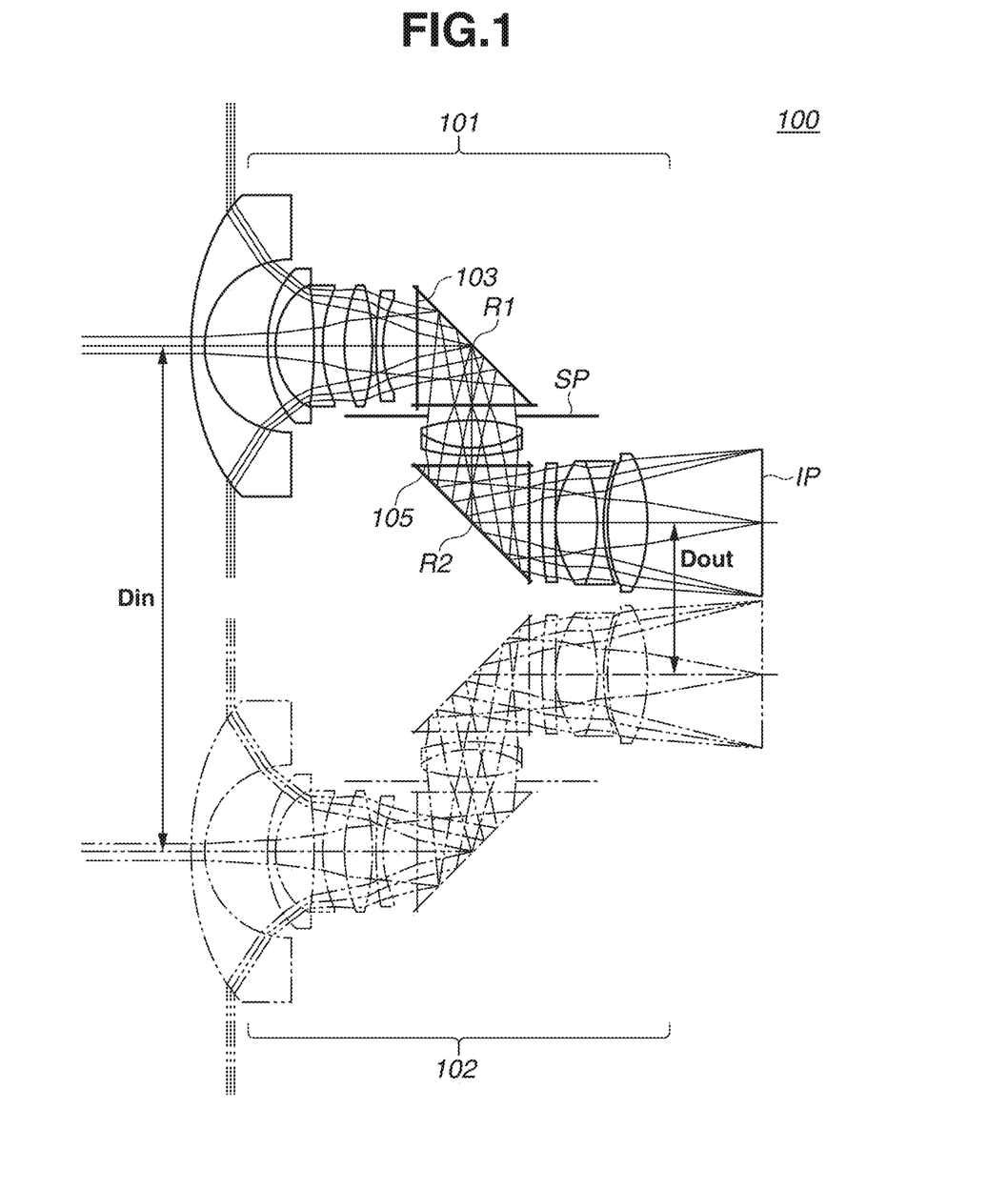
FIG. 1 is a section view illustrating a part of a lens apparatus.

A first exemplary embodiment of the disclosure will be described below. FIG. 1 is a section view illustrating a part of a lens apparatus according to a first exemplary embodiment.

As illustrated in FIG. 1, a lens apparatus 100 according to the present exemplary embodiment includes two optical systems 101 and 102. The optical systems 101 and 102 are held by a housing (not illustrated). According to the present exemplary embodiment, the optical systems 101 and 102 are identical except for the reflecting direction on reflecting members (described below), and therefore the following descriptions will be made centering on the optical system 101 on a representative basis. Hereinafter, in the present specification, in a case where the optical systems 101 and 102 is described to be identical, it means that the lens configuration is identical except for the reflecting direction on reflecting members.

The optical system 101 includes two reflecting members 103 and 105. A first reflecting member 103 has a reflecting surface R1 for bending the optical path. A second reflecting member 105 has a reflecting surface R2 for bending the optical path. A diaphragm SP is provided between the first reflecting member 103 and the second reflecting member 105.

Referring to FIG. 1, on an image plane (paraxial image forming position) IP, an image sensor, such as a charge coupled device (CCD) sensor and a complementary metal oxide semiconductor (CMOS) sensor, or a film is disposed.

Images (optical images) are formed on the image plane IP by the optical systems 101 and 102. More specifically, in the lens apparatus 100 according to the present exemplary embodiment, two optical images obtained with the use of the two optical systems 101 and 102 are formed on one image sensor.

Figure 2:
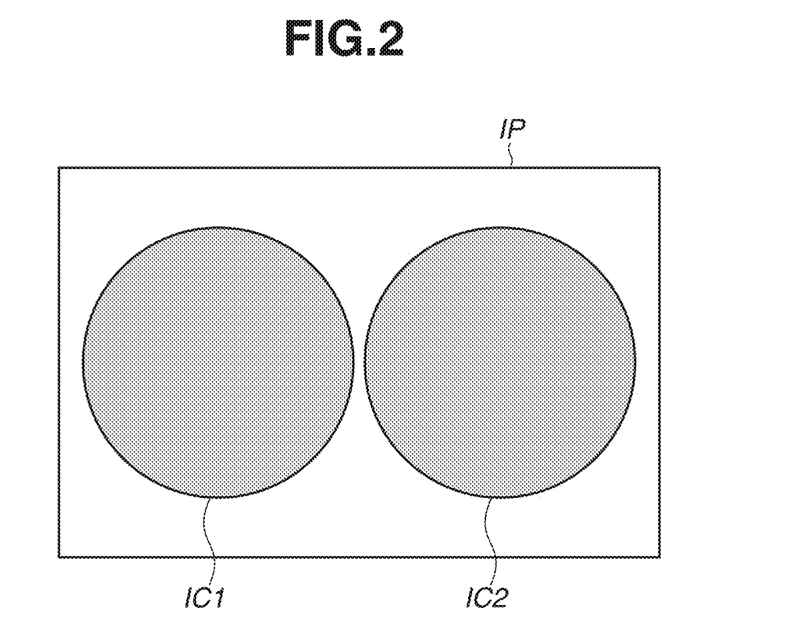
FIG. 2 schematically illustrates image circles formed by two optical systems of the lens apparatus.

FIG. 2 illustrates two image circles (areas in which optical images are formed: effective image circles) IC1 and IC2 formed on the image plane IP. The image circle IC1 is formed by the optical system 101, and the image circle IC2 is formed by the optical system 102. Thus, according to the present exemplary embodiment, two images with a parallax can be acquired with one image sensor.

The optical system 101 according to the present exemplary embodiment will be described below.

Figure 3:
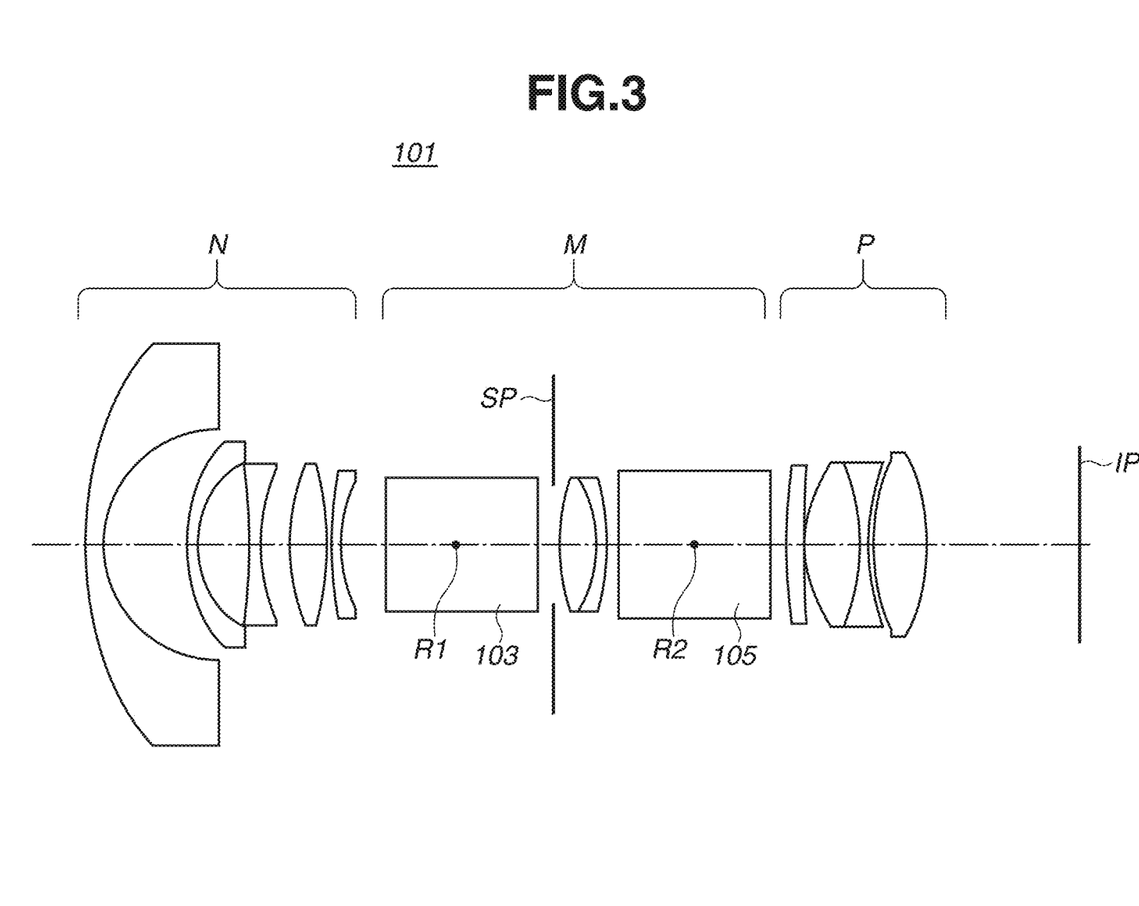
FIG. 3 is a section view illustrating an optical system according to a first exemplary embodiment.

FIG. 3 is a section view illustrating the optical system 101 according to the present exemplary embodiment. The optical path bent by the reflecting members 103 and 105 is illustrated in a straightened state.

The optical system 101 includes a front lens unit N, an intermediate lens unit M, and a rear lens unit P in this order from an object side to an image plane side.

The front lens unit N has a negative refractive power. The intermediate lens unit M includes the first reflecting member 103 disposed at a position adjacent to the front lens unit N, and the second reflecting member 105 disposed at a position adjacent to the rear lens unit P. Although, in the present exemplary embodiment, both the first reflecting member 103 and the second reflecting member 105 are prisms, these members may be simple mirrors. In the case of using a prism as a reflecting member, the light incident surface and the light emitting surface may be either flat or curved surface.

Referring to FIG. 3, the reflecting surfaces R1 and R2 are disposed at positions R1 and R2, respectively.

Figure 4:
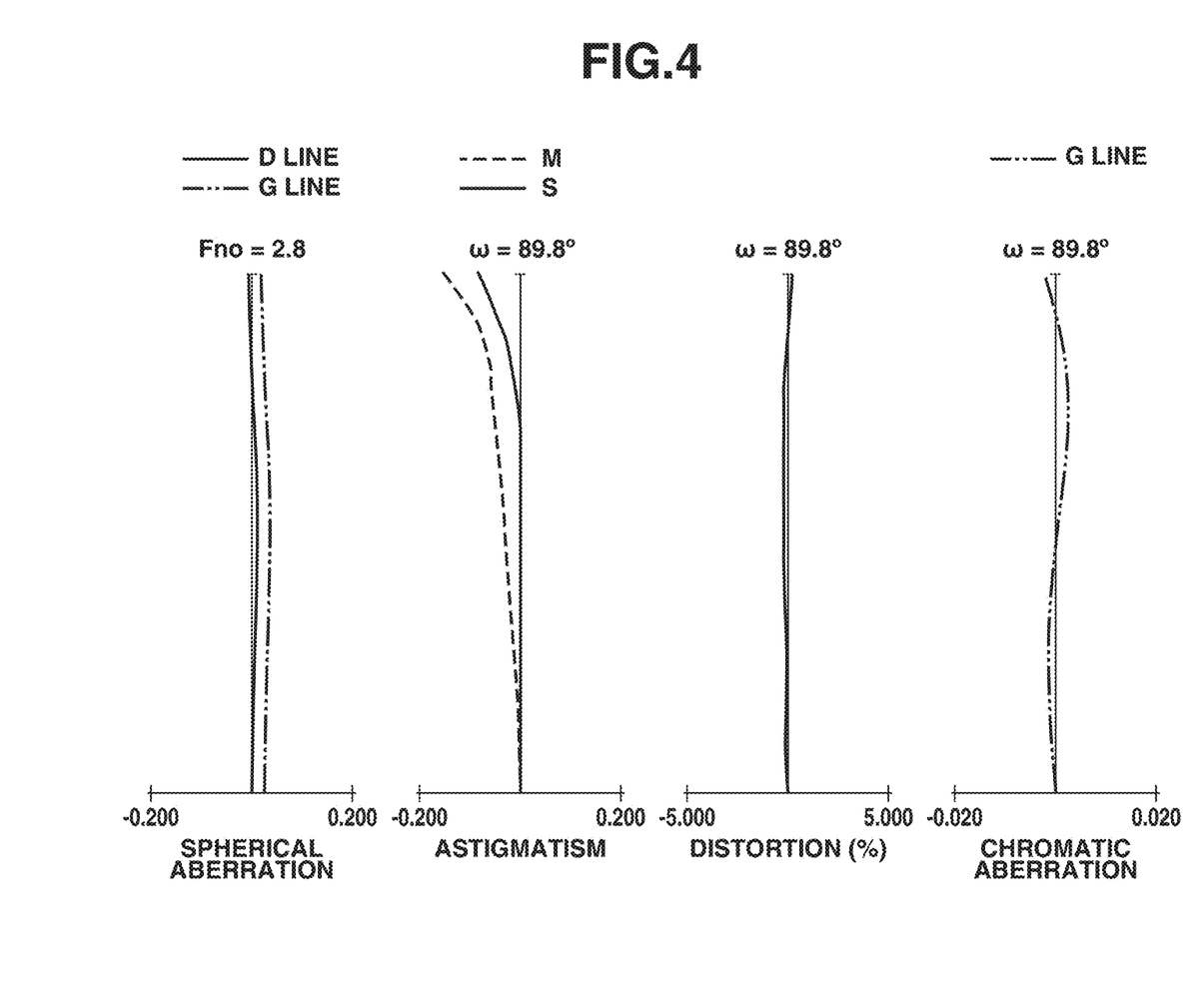
FIG. 4 illustrates aberration charts for the optical system according to the first exemplary embodiment.

FIG. 4 illustrates aberration charts for the optical system 101 when focusing on an object at infinity according to the present exemplary embodiment. In each aberration chart, Fno denotes the F number and w denotes the half angle of view (degrees). Referring to the spherical aberration chart in FIG. 4, the solid line denotes the spherical aberration for the d line (with a wavelength of 587.6 nanometers), and the two-point chain line denotes the spherical aberration for the g line (with a wavelength of 435.8 nanometers). In the astigmatism chart, the solid line (S) denotes the astigmatism of the sagittal image surface for the d line, and the dashed line (M) denotes the astigmatism of the meridional image plane for the d line. The distortion aberration chart illustrates the distortion for the d line. The chromatic aberration chart illustrates the chromatic aberration for the g line. The above descriptions also apply to the following aberration charts.

Characteristics of the optical system 101 according to the present exemplary embodiment will be described below.

In order to capture an image (video image) adding a sense of realism, it is important that the optical system 101 is configured to perform stereoscopic image capturing by using a wide-angle lens and to have a large base length.

The optical system 101 according to the present exemplary embodiment includes the front lens unit N having a negative refractive power, thus providing a wide angle of view in image capturing.

The optical system 101 according to the present exemplary embodiment includes the front lens unit N on the object side of the intermediate lens unit M and the rear lens unit P on the image plane side of the intermediate lens unit M. The intermediate lens unit M has the reflecting surfaces R1 and R2. This configuration achieves high optical performance while maintaining the small size of the optical system 101. In a wide-angle imaging optical system, if a reflecting surface is provided on a first surface that is closest to an object in the optical system 101, the reflecting surface is enlarged because of steep light in the marginal angle of view on the first surface. By contrast, if a reflecting surface is provided on a last surface that is closest to the image plane in the optical system 101, a back focus to a certain degree to dispose the reflecting surface is secured. As a result, the power of the front lens unit N is to be increased, making it difficult to excellently correct the distortion aberration and the chromatic aberration of magnification. By contrast, as in the present exemplary embodiment, the entire apparatus can be reduced in size by disposing reflecting surfaces in the intermediate lens unit M where the height of light is comparatively small. In addition, the distortion aberration and the astigmatism can be easily corrected by suitably designing the configurations of the front lens unit N and the rear lens unit P which are disposed at positions where the height of light is comparatively large.

The optical system 101 according to the present exemplary embodiment is configured so that, with the optical path bent by the reflecting members 103 and 105, the following conditional expression is satisfied:

$$0.05 < Dout/Din < 0.50. \quad (1)$$

In the conditional expression (1), din denotes the distance between the surface vertexes of the lenses closest to the object in the two optical systems 101 and 102, and Dout denotes the distance between the surface vertexes of the lenses closest to the image plane in the two optical systems 101 and 102.

The conditional expression (1) defines the ratio of the distance between the lens surfaces closest to the image plane to the distance between the lens surfaces closest to the object side in the optical systems 101 and 102. Satisfying the conditional expression (1) enables reducing the size of the entire apparatus while securing a sufficient base length.

If Dout/Din is less than the lower limit of the conditional expression (1), the distance between the surface vertexes of the lenses closest to the image plane becomes too small, resulting in an interference between the rear lens units P of the optical systems 101 and 102, or resulting in an excessive distance between the surface vertexes of the lenses closest to the object. This makes it difficult to capture a stereoscopic image which is natural for human eyes. If Dout/Din exceeds the upper limit, the distance between the surface vertexes of the lenses closest to the object becomes too small, failing to secure a base length. This case also makes it difficult to capture a stereoscopic image which is natural for human eyes, or causes the distance between the rear lens units P to excessively increase, resulting in an increase in size of the entire apparatus.

According to the present exemplary embodiment, the above-described configuration enables the base length to increase while reducing the size of the lens apparatus 100.

The numerical range for the conditional expression (1) is to be set to the range represented by the following conditional expression (1a), and is to be set to the range represented by the following conditional expression (1b):

$$0.07 < Dout/Din < 0.47 \quad (1a)$$

$$0.10 < Dout/Din < 0.45. \quad (1b)$$

A configuration of the lens apparatus 100 according to the present exemplary embodiment will be described below. The following configuration is to be satisfied by at least either one of the two optical systems 101 and 102. More desirably, the two optical systems 101 and 102 have an identical configuration, and the following configuration is satisfied by both of the two optical systems 101 and 102.

In one embodiment, positive refractive power is provided between the reflecting surface R1 of the first reflecting member 103 and the reflecting surface R2 of the second reflecting member 105.

In the optical system 101 according to the present exemplary embodiment, since the optical path is bent twice in the intermediate lens unit M which therefore is large in size to a certain extent. In addition, diverging light from the front lens unit N is incident on the intermediate lens unit M. Thus, if a component of positive refractive power is not provided to the intermediate lens unit M, the diameter of the lens surface on the object side in the rear lens unit P will increase.

On the other hand, the rear lens unit P can be made small in size by providing positive refractive power between the reflecting surface R1 of the first reflecting member 103 and the reflecting surface R2 of the second reflecting member 105. According to the present exemplary embodiment, there is disposed a cemented lens having positive refractive power, including a positive lens and a negative lens bonded together, between the first reflecting member 103 and the second reflecting member 105. This configuration excellently corrects the axial chromatic aberration while reducing the diameter of the rear lens unit P.

In using prisms for the first reflecting member 103 and the second reflecting member 105, the refractive powers of the surface on the light emission side of the first reflecting member 103 and the surface on the light incident side of the second reflecting member 105 also contribute as the refractive power between the reflecting surface R1 and the reflecting surface R2.

In one embodiment, the front lens unit N includes one positive lens and two negative lenses. Strengthening negative refractive power of the front lens unit N enables reducing the size of the optical system 101 while providing a wide angle of view. In such a case, sharing negative refractive power with at least two negative lenses enables preventing the occurrence of the distortion aberration and the astigmatism. Providing at least one positive lens enables excellently correcting the chromatic aberration of magnification.

In one embodiment, the rear lens unit P has positive refractive power. This configuration achieves a retrofocus type refractive power distribution in the optical system 101, thus securing both a wide angle of view and a back focus.

In addition, for the rear lens unit P having positive refractive power, the rear lens unit P have two positive lenses and one negative lens. Sharing positive refractive power of the rear lens unit P with at least two positive lenses enables preventing the occurrence of the coma aberration and the astigmatism. Providing at least one negative lens enables excellently correcting the axial chromatic aberration and the chromatic aberration of magnification.

In addition, the optical path is bent twice in the optical system 101. As the number of times of bending the optical path increases, a physical space for providing reflecting members expands. Moreover, the configuration of the optical system 101 becomes complicated.

In addition, the rear lens unit P includes a positive lens closest to the object. An off-axis light beam incident on the rear lens unit P from the object side is diverging light. Thus, providing positive refractive power to the lens closest to the object in the rear lens unit P enables reducing the diameters of the lenses, in the rear lens unit P, disposed on the image plane side of the lens closest to the object in the rear lens unit P. This makes it easier to prevent the interference between the rear lens units P of the two optical systems 101 and 102.

In one embodiment, two optical images (image circles IC1 and IC2) formed by the two optical systems 101 and 102, respectively, are captured by one image sensor. This configuration is able to downsize the entire apparatus including the image sensor.

A description will be provided of conditions to be satisfied by the optical system 101 of the lens apparatus 100 according to the present exemplary embodiment. The following conditions is to be satisfied by at least either one of the two optical systems 101 and 102. Moreover, the following conditions are satisfied by both of the two optical systems 101 and 102.

$$2.00 < fm/f < 20.00 \tag{2}$$

$$0.10 < |fn/fp| < 0.50 \tag{3}$$

$$0.10 < L1/L < 0.60 \tag{4}$$

$$0.10 < L2/L < 0.50 \tag{5}$$

In the conditional expressions, fm denotes the focal length of the intermediate lens unit M. f denotes the focal length of the entire optical system 101. fn denotes the focal length of the front lens unit N. fp denotes the focal length of the rear lens unit P. L1 denotes the distance on the optical axis from the lens surface closest to the object in the front lens unit N to the reflecting surface R1 of the first reflecting member 103. L denotes the distance on the optical axis from the lens surface closest to the object in the optical system 101 to the image plane. L2 denotes the distance on the optical axis from the reflecting surface R2 of the second reflecting member 105 to the lens surface closest to the image plane in the rear lens unit P. Herein, the "distance on the optical axis" refers to the distance on the optical axis in a state where the optical path bent by reflecting members is straightened (the state illustrated in FIG. 3).

A conditional expression (2) defines a range for the focal length of the intermediate lens unit M. If fm/f is less than the lower limit of the conditional expression (2), the refractive power of the intermediate lens unit M becomes too strong, making it difficult to excellently correct the spherical aberration and the axial chromatic aberration. If fm/f exceeds the upper limit of the conditional expression (2), the refractive power of the intermediate lens unit M becomes too weak, resulting in an increase in the diameter of the rear lens units P of the two optical systems 101 and 102.

The numerical range for the conditional expression (2) is to be set to the range represented by the following conditional expression (2a), and moreover is to be set to the range represented by the following conditional expression (2b):

$$3.00 < fm/f < 19.00 \tag{2a}$$

$$4.00 < fm/f < 18.00. \tag{2b}$$

A conditional expression (3) defines the ratio of the focal length of the front lens unit N to the focal length of the rear lens unit P. If |fn/fp| is less than the lower limit of the conditional expression (3), negative refractive power of the front lens unit N becomes too strong, making it difficult to excellently correct the chromatic aberration of magnification and the distortion aberration. If |fn/fp| exceeds the upper limit of the conditional expression (3), the refractive power of the rear lens unit P becomes too strong, making it difficult to excellently correct the coma aberration and the astigmatism.

The numerical range for the conditional expression (3) is to be set to the range represented by the following conditional expression (3a), and moreover is to be set to the range represented by the following conditional expression (3b):

$$0.12 < |fn/fp| < 0.45 \tag{3a}$$

$$0.14 < |fn/fp| < 0.40. \tag{3b}$$

A conditional expression (4) defines a range for the distance on the optical axis from the surface closest to the object in the front lens unit N to the reflecting surface RE If L1/L is less than the lower limit of the conditional expression (4), the distance from the surface closest to the object in the front lens unit N to the reflecting surface R1 becomes too small, making it difficult to provide a suitable thickness to the lenses included in the front lens unit N. As a result, it becomes difficult to excellently correct the chromatic aberration of magnification and the distortion aberration. If L1/L exceeds the upper limit of the conditional expression (4), the diameter of the lenses included in the front lens unit N becomes too large, resulting in an undesirable increase in size of the optical system 101.

The numerical range for the conditional expression (4) is to be set to the range represented by the following conditional expression (4a), and moreover is to be set to the range represented by the following conditional expression (4b):

$$0.20 < L1/L < 0.50 \tag{4a}$$

$$0.30 < L1/L < 0.45 \tag{4b}$$

A conditional expression (5) defines a range for the distance on the optical axis from the reflecting surface R2 to the surface closest to the image plane in the rear lens unit P. If L2/L is less than the lower limit of the conditional expression (5), the distance from the reflecting surface R2 to the surface closest to the image plane in the rear lens unit P becomes too small, making it difficult to provide a suitable thickness to the lenses included in the rear lens unit P. As a result, it becomes difficult to excellently correct the coma aberration and the astigmatism. If L2/L exceeds the upper limit of the conditional expression (5), the diameter of the lenses included in the rear lens unit P becomes too large, resulting in an undesirable increase in size of the optical system 101.

The numerical range for the conditional expression (5) is to be set to the range represented by the following conditional expression (5a), and moreover is to be set to the range represented by the following conditional expression (5b):

$$0.15 < L2/L < 0.40 \tag{5a}$$

$$0.19 < L2/L < 0.30. \tag{5b}$$

In one embodiment, the horizontal angle of view of the optical system 101 is 150 degrees or more. The horizontal angle of view refers to the angle of view on the plane including the optical axes of the optical systems 101 and 102. The angle of view refers to the angle of view with respect to light which reaches the outermost circumference of each image circle. Setting the horizontal angle of view of the optical system 101 to 150 degrees or more enables enhancing a sense of realism for an image (video image) captured in stereoscopic image capturing using the lens apparatus 100.

In one embodiment, the distance between the surface vertexes of the lenses closest to the object in the optical systems 101 and 102 (base length on the object side, Din) is 40 mm or more and 65 mm or less. This is because the base length for the human eyes is about 60 mm Setting the base length on the object side in the optical systems 101 and 102 to 40 mm or more and 65 mm or less enables capturing a naturally viewable stereoscopic image (video image).

Other exemplary embodiments will be described below.

Figure 5:
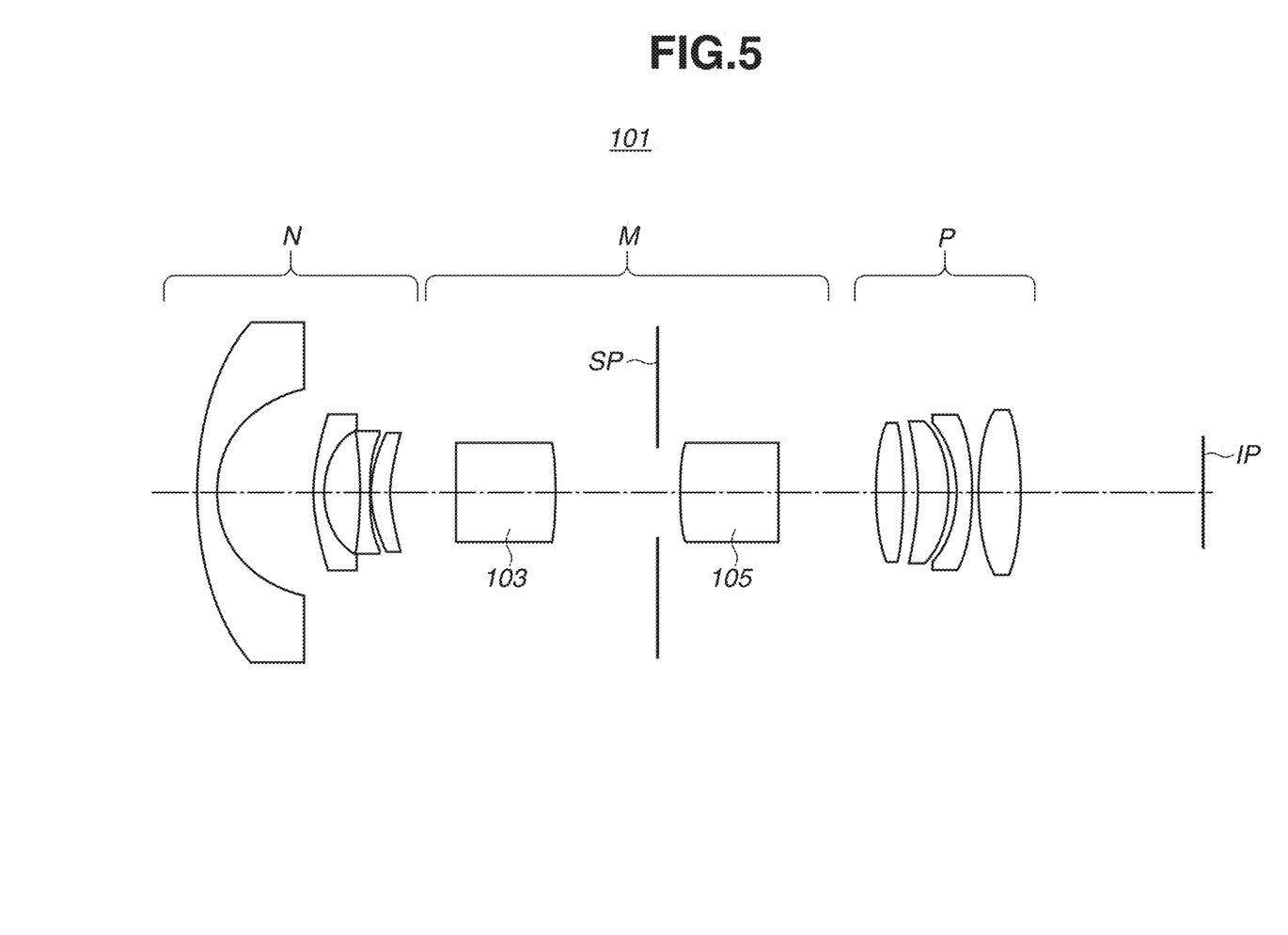
FIG. 5 is a section view illustrating an optical system according to a second exemplary embodiment.

FIG. 5 is a section view illustrating an optical system 101 according to a second exemplary embodiment. According to the second exemplary embodiment, as in the first exemplary embodiment, both the first reflecting member 103 and the second reflecting member 105 are prisms. However, according to second exemplary embodiment, unlike the first exemplary embodiment, positive refractive power is provided between the reflecting surface of the first reflecting member 103 and the reflecting surface of the second reflecting member 105 by using curved surfaces for the surface on the light emission side of the first reflecting member 103 and the surface on the light incident side of the second reflecting member 105 in the intermediate lens unit M.

Figure 6:
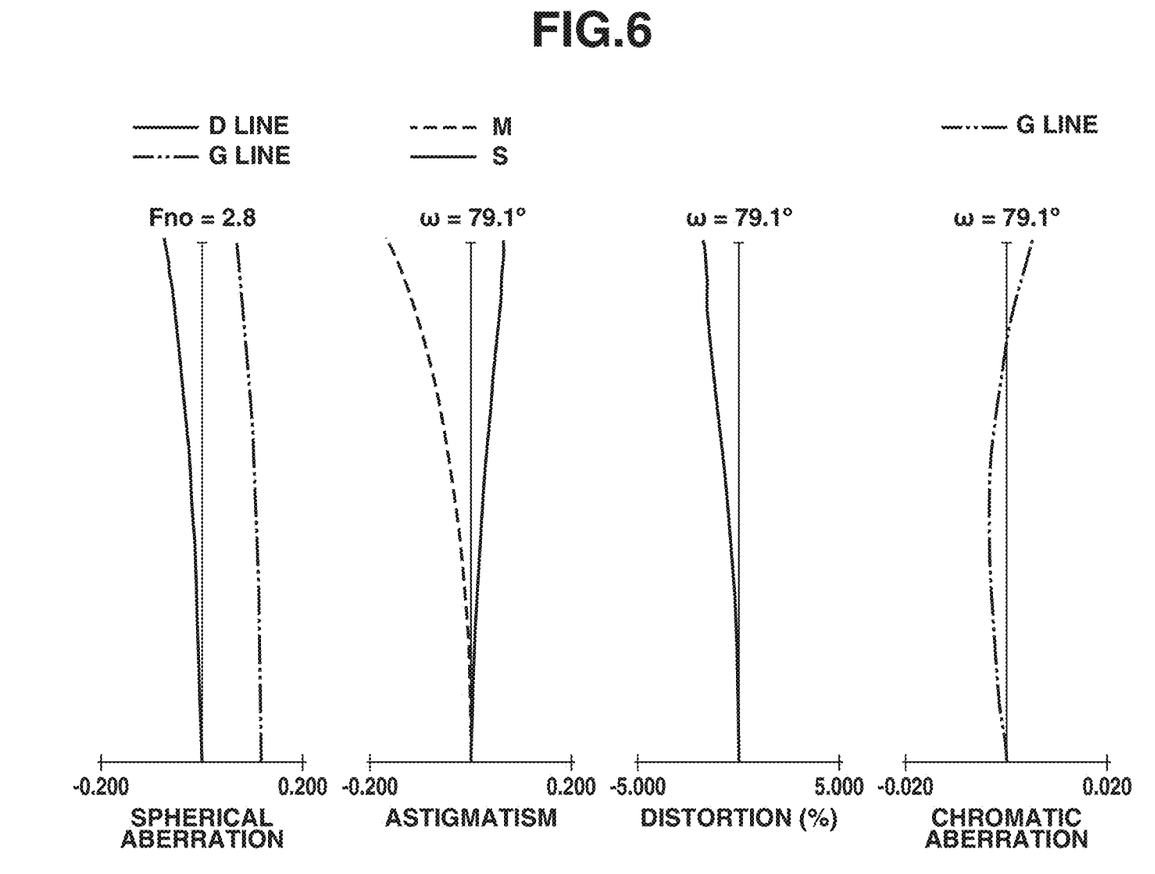
FIG. 6 illustrates aberration charts for the optical system according to the second exemplary embodiment.

FIG. 6 illustrates aberration charts for an optical system 101 according to the second exemplary embodiment.

Figure 7:
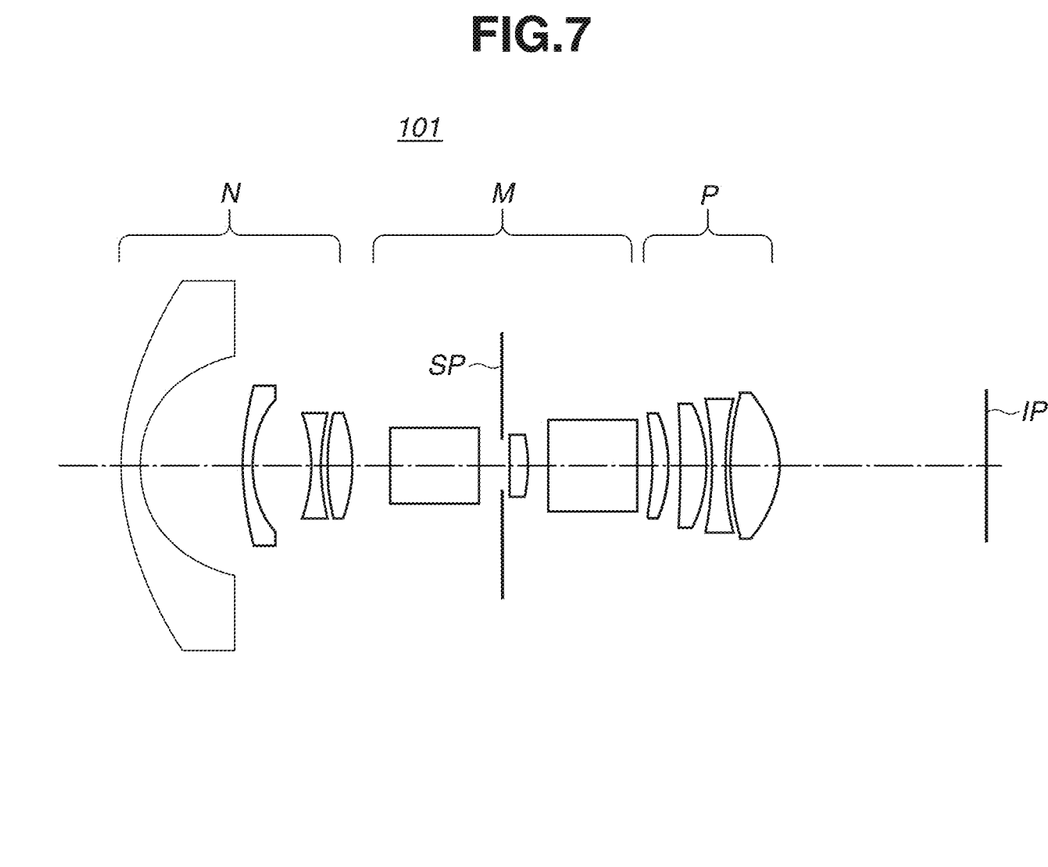
FIG. 7 is a section view illustrating an optical system according to a third exemplary embodiment.

FIG. 7 is a section view illustrating an optical system 101 according to a third exemplary embodiment. The optical system 101 according to the third exemplary embodiment differs from the optical systems 101 according to the first and the second exemplary embodiments in the configurations of the front lens unit N, the intermediate lens unit M, and the rear lens unit P. In the intermediate lens unit M according to the third exemplary embodiment, as in the first exemplary embodiment, both the first reflecting member 103 and the second reflecting member 105 are prisms.

Figure 8:
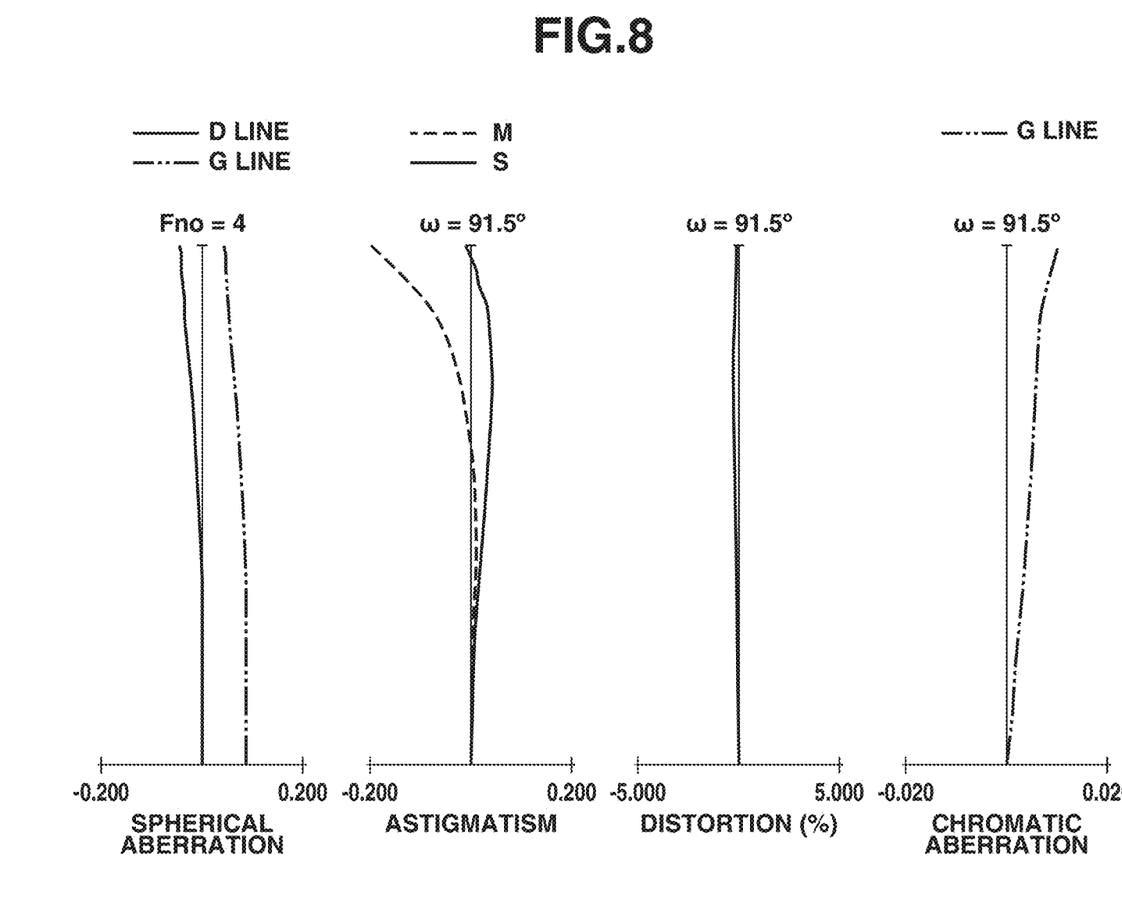
FIG. 8 illustrates aberration charts for the optical system according to the third exemplary embodiment.

FIG. 8 illustrates aberration charts for the optical system 101 according to the third exemplary embodiment.

Figure 9:
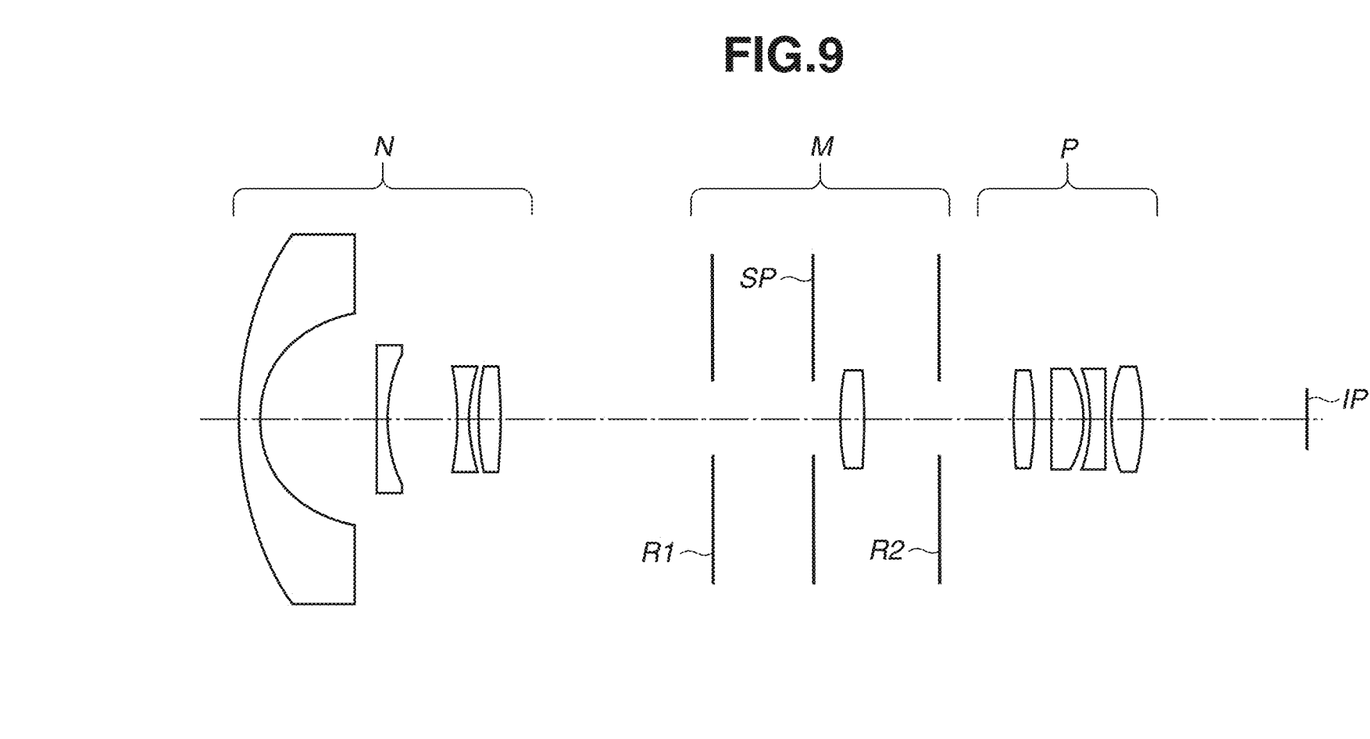
FIG. 9 is a section view illustrating an optical system according to a fourth exemplary embodiment.

FIG. 9 is a section view illustrating an optical system 101 according to a fourth exemplary embodiment. The optical system 101 according to the fourth exemplary embodiment differs from the optical systems 101 according to the first, the second, and the third exemplary embodiments in that the first reflecting member 103 and the second reflecting member 105 are mirrors.

Figure 10:
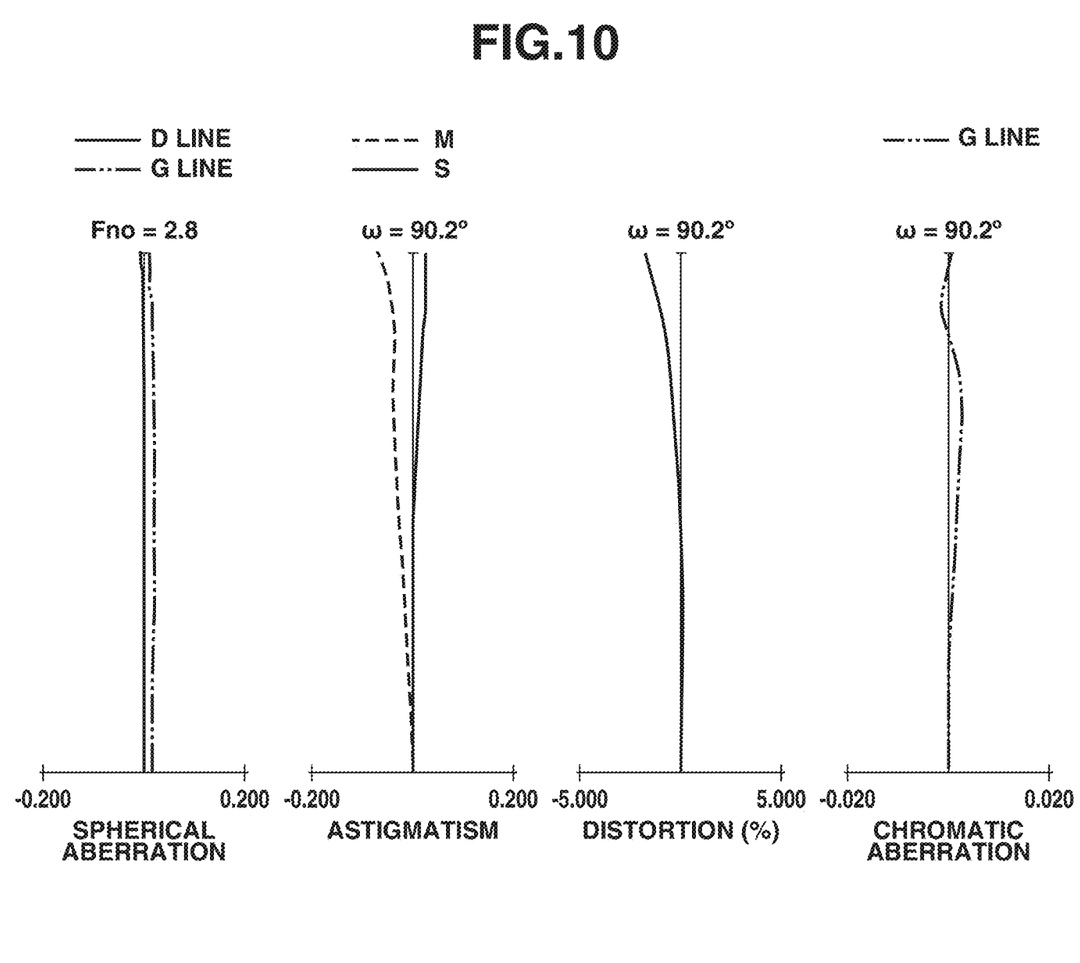
FIG. 10 illustrates aberration charts for the optical system according to the fourth exemplary embodiment.

FIG. 10 illustrates aberration charts for the optical system 101 according to the fourth exemplary embodiment.

First to fourth numerical embodiments corresponding to the optical system according to respective exemplary embodiments will be provided below. Each numerical embodiment illustrates a state of focusing on an object at infinity. In each numerical embodiment, the surface number refers to the order of optical surface when counted from the object side. r denotes the curvature radius of the i-th optical surface (i-th surface, where i is a natural number), and d denotes the distance between the i-th surface and the (i+1)-th surface, where i is counted from the object side. nd and vd are the refractive index and the Abbe number, respectively, for the d line through each lens.

In each numerical embodiment, the surface number is supplied with a trailing asterisk (*) for the aspherical lens surface. For each aspherical coefficient, "e±P" means "*10^{±P}". The aspherical shape of an optical surface is represented by the following formula (A):

$$x = (h^2/R)/[1+\{1-(1+k)(h/R)^2\}^{1/2}] + A4*h^4 + A6*h^6 + A8*h^8 + A10*h^{10}, \tag{A}$$

where x denotes the displacement amount from the surface vertex in the optical axis direction, h denotes the height from the optical axis in a direction perpendicular to the optical axis direction, R denotes the paraxial curvature radius, k denotes the conic constant, and A4, A6, A8, and A10 denote aspherical coefficients.

First Numerical Embodiment

| Unit: mm | | | | | |
|---|---|---|---|---|---|
| Surface Data | | | | | |
| Surface No. | r | d | nd | vd | Effective Diameter |
| 1 | 29.782 | 1.75 | 2.00100 | 29.1 | 34.32 |
| 2 | 10.263 | 7.49 | | | 20.00 |
| 3 | 14.582 | 0.95 | 2.00100 | 29.1 | 16.55 |
| 4 | 8.736 | 4.58 | | | 13.86 |
| 5 | −40.268 | 1.00 | 1.77200 | 50.0 | 13.42 |
| 6 | 18.947 | 2.55 | | | 12.80 |
| 7 | 19.251 | 3.23 | 1.68134 | 31.9 | 13.15 |

-continued

Unit: mm

| | | | | | |
|---|---|---|---|---|---|
| 8 | −25.358 | 0.50 | | | 12.89 |
| 9 | 44.500 | 0.80 | 1.43875 | 94.7 | 11.52 |
| 10 | 13.913 | 4.00 | | | 10.60 |
| 11 | ∞ | 13.50 | 1.51633 | 64.1 | 10.53 (prism) |
| 12 | ∞ | 1.50 | | | 9.79 |
| 13 (aperture) | ∞ | 0.50 | | | 10.22 |
| 14 | 19.580 | 3.29 | 1.52310 | 50.8 | 10.57 |
| 15 | −11.282 | 1.00 | 1.95375 | 32.3 | 10.56 |
| 16 | −16.753 | 1.01 | | | 10.87 |
| 17 | ∞ | 13.40 | 1.51633 | 64.1 | 10.44 (prism) |
| 18 | ∞ | 1.56 | | | 11.65 |
| 19* | 37.785 | 1.46 | 1.58313 | 59.4 | 12.55 |
| 20 | 101.565 | 0.10 | | | 12.78 |
| 21 | 11.866 | 4.98 | 1.43875 | 94.7 | 13.56 |
| 22 | −18.915 | 0.75 | 2.00330 | 28.3 | 13.27 |
| 23 | 19.599 | 0.50 | | | 13.54 |
| 24 | 19.286 | 4.78 | 1.43875 | 94.7 | 14.33 |
| 25 | −16.809 | 13.50 | | | 15.00 |
| Image Plane | ∞ | | | | |

Aspherical Surface Data

Surface No. 19

K = 0.00000e+000    A4 = −4.90105e−005    A6 = −1.57449e−008
A8 = −1.85511e−009

Various Data

| | |
|---|---|
| Focal Length | 5.57 |
| F number | 2.80 |
| Half Angle of View (degrees) | 89.8 |
| Image Height | 8.75 |
| Total Lens Length | 88.66 |
| BF | 13.50 |
| Incident-Pupil Position | 10.06 |
| Emission-Pupil Position | −32.81 |
| Front Principal-Point Position | 14.96 |
| Rear Principal-Point Position | 7.93 |

Single Lens Element Data

| Lens | Starting Surface | Focal Length |
|---|---|---|
| 1 | 1 | −16.38 |
| 2 | 3 | −23.69 |
| 3 | 5 | −16.57 |
| 4 | 7 | 16.55 |
| 5 | 9 | −46.51 |
| 6 | 11 | 0.00 |
| 7 | 14 | 14.20 |
| 8 | 15 | −39.77 |
| 9 | 17 | 0.00 |
| 10 | 19 | 102.33 |
| 11 | 21 | 17.48 |
| 12 | 22 | −9.50 |
| 13 | 24 | 21.33 |

Second Numerical Embodiment

Unit: mm

Surface Data

| Surface No. | r | d | nd | vd | Effective Diameter |
|---|---|---|---|---|---|
| 1 | 24.253 | 1.75 | 1.95375 | 32.3 | 25.99 |
| 2 | 8.333 | 7.72 | | | 15.80 |
| 3 | 16.867 | 0.95 | 1.84100 | 43.2 | 11.38 |
| 4 | 6.574 | 2.66 | | | 9.31 |
| 5 | −63.543 | 1.00 | 1.84750 | 43.0 | 9.04 |
| 6 | 16.412 | 0.07 | | | 8.71 |
| 7 | 9.874 | 1.56 | 1.92286 | 18.9 | 8.77 |

-continued

Unit: mm

| | | | | | |
|---|---|---|---|---|---|
| 8 | 14.686 | 5.29 | | | 8.31 |
| 9 | ∞ | 8.00 | 1.88300 | 40.8 | 7.21 (prism) |
| 10 | −33.333 | 8.26 | | | 6.23 |
| 11 (aperture) | ∞ | 2.00 | | | 6.97 |
| 12 | 20.000 | 8.00 | 1.51633 | 64.1 | 7.36 (prism) |
| 13 | ∞ | 7.90 | | | 7.20 |
| 14 | 21.772 | 2.26 | 1.43875 | 94.9 | 10.00 |
| 15 | −32.397 | 1.00 | | | 10.19 |
| 16 | −27.028 | 2.62 | 1.45600 | 90.9 | 10.25 |
| 17 | −9.753 | 0.66 | | | 10.51 |
| 18 | −8.981 | 1.20 | 1.96300 | 24.1 | 10.30 |
| 19 | −18.860 | 0.50 | | | 11.26 |
| 20 | 17.051 | 3.50 | 1.43875 | 94.7 | 12.17 |
| 21 | −24.348 | 14.73 | | | 12.18 |
| Image Plane | ∞ | | | | |

Various Data

| | |
|---|---|
| Focal Length | 3.25 |
| F Number | 2.80 |
| Half Angle of View (Degrees) | 79.1 |
| Image Height | 4.40 |
| Total Lens Length | 81.63 |
| Bf | 14.73 |
| Incident-Pupil Position | 8.79 |
| Emission-Pupil Position | 1601.83 |
| Front Principal-Point Position | 12.05 |
| Rear Principal-Point Position | 11.48 |

Single Lens Element Data

| Lens | Starting Surface | Focal Length |
|---|---|---|
| 1 | 1 | −14.07 |
| 2 | 3 | −13.37 |
| 3 | 5 | −15.30 |
| 4 | 7 | 28.27 |
| 5 | 9 | 37.75 |
| 6 | 12 | 38.73 |
| 7 | 14 | 30.06 |
| 8 | 16 | 31.94 |
| 9 | 18 | −18.93 |
| 10 | 20 | 23.46 |

Third Numerical Embodiment

Unit: mm

Surface Data

| Surface No. | r | d | nd | vd | Effective Diameter |
|---|---|---|---|---|---|
| 1 | 29.003 | 1.75 | 2.00100 | 29.1 | 33.84 |
| 2 | 10.353 | 9.81 | | | 20.00 |
| 3 | 27.827 | 0.95 | 2.00100 | 29.1 | 14.10 |
| 4 | 10.911 | 5.58 | | | 12.05 |
| 5 | −14.687 | 1.00 | 1.92250 | 36.0 | 9.36 |
| 6 | 20.939 | 0.65 | | | 9.19 |
| 7 | 29.084 | 2.26 | 1.89286 | 20.4 | 9.34 |
| 8 | −16.390 | 3.71 | | | 9.33 |
| 9 | ∞ | 8.50 | 1.88300 | 40.8 | 6.72 (prism) |
| 10 | ∞ | 2.21 | | | 4.85 |
| 11 (aperture) | ∞ | 0.60 | | | 5.22 |
| 12 | 571.710 | 1.69 | 1.52310 | 50.8 | 5.32 |
| 13 | −20.256 | 2.00 | | | 5.47 |
| 14 | ∞ | 8.50 | 1.88300 | 40.8 | 5.51 (prism) |
| 15 | ∞ | 1.42 | | | 7.87 |
| 16* | −56.169 | 1.71 | 1.43875 | 94.7 | 8.60 |
| 17 | −12.502 | 0.98 | | | 9.25 |
| 18 | −176.273 | 2.63 | 1.43875 | 94.9 | 10.13 |
| 19 | −13.451 | 0.50 | | | 10.70 |
| 20 | −31.094 | 1.20 | 2.00540 | 27.7 | 10.86 |
| 21 | 26.939 | 0.50 | | | 11.42 |

-continued

Unit: mm

| | | | | | |
|---|---|---|---|---|---|
| 22 | 25.291 | 4.73 | 1.43875 | 94.9 | 12.12 |
| 23 | −9.963 | 20.00 | | | 12.95 |
| Image Plane | ∞ | | | | |

Aspherical Surface Data

Surface No. 16

K = 0.00000e+000   A4 = −3.70913e−004   A6 = −1.45620e−008
A8 = −7.58114e−008

Various Data

| | |
|---|---|
| Focal Length | 4.40 |
| F Number | 4.00 |
| Half Angle of View (Degrees) | 91.5 |
| Image Height | 7.00 |
| Total Lens Length | 82.89 |
| Bf | 20.00 |
| Incident-Pupil Position | 10.16 |
| Emission-Pupil Position | −81.55 |
| Front Principal-Point Position | 14.36 |
| Rear Principal-Point Position | 15.60 |

Single Lens Element Data

| Lens | Starting Surface | Focal Length |
|---|---|---|
| 1 | 1 | −16.88 |
| 2 | 3 | −18.45 |
| 3 | 5 | −9.23 |
| 4 | 7 | 12.02 |
| 5 | 9 | 0.00 |
| 6 | 12 | 37.43 |
| 7 | 14 | 0.00 |
| 8 | 16 | 36.22 |
| 9 | 18 | 33.03 |
| 10 | 20 | −14.21 |
| 11 | 22 | 16.99 |

Fourth Numerical Embodiment

Unit: mm

Surface Data

| Surface No. | r | d | nd | vd | Effective Diameter |
|---|---|---|---|---|---|
| 1 | 27.246 | 1.75 | 1.95375 | 32.3 | 28.03 |
| 2 | 8.333 | 9.26 | | | 16.01 |
| 3* | −934.503 | 0.95 | 1.95375 | 32.3 | 10.73 |
| 4 | 11.819 | 5.54 | | | 9.44 |
| 5 | −18.679 | 1.00 | 1.88067 | 41.1 | 7.47 |
| 6 | 13.556 | 0.65 | | | 7.38 |
| 7 | 18.400 | 1.85 | 1.89286 | 20.4 | 7.61 |
| 8 | −28.681 | 17.00 | | | 7.63 |
| 9 | ∞ | 8.00 | | | 5.40 (mirror) |
| 10 (aperture) | ∞ | 2.18 | | | 6.78 |
| 11 | 20.000 | 1.92 | 1.51633 | 64.1 | 7.22 |
| 12 | −74.590 | 6.00 | | | 7.20 |
| 13 | ∞ | 6.00 | | | 6.78 (mirror) |
| 14* | 36.227 | 1.57 | 1.43875 | 94.9 | 7.09 |
| 15 | −32.397 | 1.43 | | | 7.26 |
| 16 | 541.636 | 2.57 | 1.43875 | 94.9 | 7.41 |
| 17 | −8.431 | 0.50 | | | 7.51 |
| 18 | −12.760 | 1.20 | 1.95375 | 32.3 | 7.19 |
| 19 | 79.880 | 0.50 | | | 7.38 |
| 20 | 11.804 | 2.53 | 1.43875 | 94.9 | 7.69 |
| 21* | −19.379 | 13.12 | | | 7.67 |
| Image Plane | ∞ | | | | |

-continued

Unit: mm

Aspherical Surface Data

Surface No. 3

K = 0.00000e+000   A4 = 6.44677e−005   A6 = −5.47254e−006
A8 = 2.43046e−007   A10 = −6.92399e−009
A12 = 7.73097e−011

Surface No. 14

K = 0.00000e+000   A4 = −3.11886e−004   A6 = −3.26508e−006
A8 = −1.12520e−007

Surface No. 21

K = 0.00000e+000   A4 = 1.15426e−007   A6 = 1.95918e−008
A8 = 6.63050e−010

Various Data

| | |
|---|---|
| Focal Length | 1.80 |
| F Number | 2.80 |
| Half Angle of View (Degrees) | 90.2 |
| Image Height | 2.50 |
| Total Lens Length | 85.52 |
| Bf | 13.12 |
| Incident-Pupil Position | 8.75 |
| Emission-Pupil Position | −1027.09 |
| Front Principal-Point Position | 10.55 |
| Rear Principal-Point Position | 11.32 |

Single Lens Element Data

| Lens | Starting Surface | Focal Length |
|---|---|---|
| 1 | 1 | −13.18 |
| 2 | 3 | −12.23 |
| 3 | 5 | −8.79 |
| 4 | 7 | 12.79 |
| 5 | 11 | 30.76 |
| 6 | 14 | 39.25 |
| 7 | 16 | 18.95 |
| 8 | 18 | −11.46 |
| 9 | 20 | 17.14 |

Various numerical values in each exemplary embodiment are listed in the following Tables 1 and 2.

TABLE 1

| | Din | Dout | L | L1 | L2 |
|---|---|---|---|---|---|
| First Exemplary Embodiment | 60.0 | 18.5 | 88.7 | 33.6 | 20.8 |
| Second Exemplary Embodiment | 45.5 | 9.0 | 81.6 | 25.0 | 23.6 |
| Third Exemplary Embodiment | 52.0 | 22.0 | 82.9 | 30.0 | 17.9 |
| Fourth Exemplary Embodiment | 41.5 | 5.3 | 85.5 | 38.0 | 16.3 |

TABLE 2

| | CE: Conditional Expression | | | | |
|---|---|---|---|---|---|
| | CE 1 | CE 2 | CE 3 | CE 4 | CE 5 |
| First Exemplary Embodiment | 0.308 | 4.019 | 0.148 | 0.379 | 0.235 |
| Second Exemplary Embodiment | 0.197 | 8.508 | 0.317 | 0.306 | 0.290 |
| Third Exemplary Embodiment | 0.423 | 5.177 | 0.255 | 0.361 | 0.216 |
| Fourth Exemplary Embodiment | 0.128 | 17.087 | 0.182 | 0.444 | 0.191 |

[Imaging Apparatus]

Figure 11:
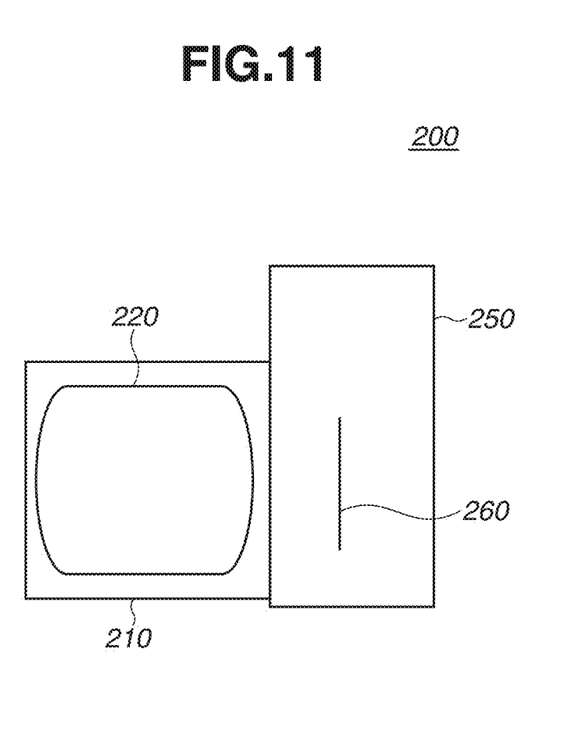
FIG. 11 is a schematic view illustrating an imaging apparatus.

An imaging apparatus according to an exemplary embodiment of the disclosure will be described below. FIG. 11 is a schematic view illustrating an imaging apparatus (digital still camera) 200 according to the present exemplary embodiment. The imaging apparatus 200 includes a camera main body 250 including an image sensor 260, and a lens apparatus 210 including optical systems 220 similar to the optical systems according to any one of the first to the fourth exemplary embodiments described above. The lens apparatus 210 and the camera main body 250 may be integrally configured, or the lens apparatus 210 may be attachable to and detachable from the camera main body 250. FIG. 11 illustrates only one optical system as two optical systems are disposed in the depth direction.

The imaging apparatus 200 according to the present exemplary embodiment includes the lens apparatus 210, which enables stereoscopic image capturing with a large base length in spite of its compact size.

The lens apparatus according to each of the above-described exemplary embodiments is applicable not only to the digital still camera illustrated in FIG. 11 but also to various types of imaging apparatuses, such as broadcasting cameras, silver-halide film cameras, or monitoring cameras.

While the disclosure has specifically been described based on the above-described exemplary embodiments, the disclosure is not limited thereto but can be combined and modified in various ways within the scope of the present disclosure.

While the disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2018-127360, filed Jul. 4, 2018, which is hereby incorporated by reference herein in its entirety.

What is claimed is:

1. A lens apparatus comprising:
two optical systems,
wherein each of the two optical systems includes a front lens unit having negative refractive power, an intermediate lens unit disposed on an image side of the front lens unit, and a rear lens unit disposed on an image side of the intermediate lens unit,
wherein each of the intermediate lens units in the two optical systems includes a first reflecting member for bending an optical path at a position adjacent to the front lens unit, and a second reflecting member for bending the optical path at a position adjacent to the rear lens unit, and
wherein the following conditional expression is satisfied:

$$0.05 < Dout/Din < 0.50,$$

where Din is a distance between surface vertexes of lenses closest to an object in the two optical systems, and Dout is a distance between surface vertexes of lenses closest to an image plane in the two optical systems.

2. The lens apparatus according to claim 1, wherein, in at least either one of the two optical systems, positive refractive power is provided between a reflecting surface of the first reflecting member and a reflecting surface of the second reflecting member.

3. The lens apparatus according to claim 2, wherein the following conditional expression is satisfied:

$$2.00 < fm/f < 20.00,$$

where, in the at least either one of the two optical systems, fm is a focal length of the intermediate lens unit, and f is a focal length of the at least either one of the two optical systems.

4. The lens apparatus according to claim 1, wherein the following conditional expression is satisfied:

$$0.10 < |fn/fp| < 0.50,$$

where, in at least either one of the two optical systems, fn is a focal length of the front lens unit, and fp is a focal length of the rear lens unit.

5. The lens apparatus according to claim 1, wherein the following conditional expression is satisfied:

$$0.10 < L1/L < 0.60,$$

where, in at least either one of the two optical systems, L1 is a distance on an optical axis from a surface closest to the object in the front lens unit to a reflecting surface of the first reflecting member, and L is a distance on the optical axis from the surface closest to the object in the front lens unit to the image plane.

6. The lens apparatus according to claim 1, wherein the following conditional expression is satisfied:

$$0.10 < L2/L < 0.50,$$

where, in at least either one of the two optical systems, L2 is a distance on an optical axis from a reflecting surface of the second reflecting member to a surface closest to the image plane in the rear lens unit, and L is a distance on the optical axis from a surface closest to the object in the front lens unit to an image plane.

7. The lens apparatus according to claim 1, wherein, in at least either one of the two optical systems, the front lens unit includes one positive lens and two negative lenses.

8. The lens apparatus according to claim 1, wherein, in at least either one of the two optical systems, the rear lens unit has positive refractive power.

9. The lens apparatus according to claim 8, wherein, in at least either one of the optical systems, the rear lens unit includes two positive lenses and one negative lens.

10. The lens apparatus according to claim 1, wherein, in at least either one of the two optical systems, the optical path is bent twice.

11. The lens apparatus according to claim 1, wherein, in at least either one of the two optical systems, the rear lens unit includes a positive lens disposed closest to the object.

12. The lens apparatus according to claim 1, wherein a horizontal angle of view of at least either one of the two optical systems is 150 degrees or more.

13. The lens apparatus according to claim 1, wherein a distance between surface vertexes of lenses disposed closest to the object in the two optical systems is 40 mm or more and 65 mm or less.

14. The lens apparatus according to claim 1, wherein the two optical systems are identical optical systems.

15. An imaging apparatus comprising:
two optical systems; and
an image sensor configured to capture optical images formed by the two optical systems,
wherein each of the two optical systems includes a front lens unit having negative refractive power, an intermediate lens unit disposed on an image side of the front lens unit, and a rear lens unit disposed on an image side of the intermediate lens unit,
wherein each of the intermediate lens units in the two optical systems includes a first reflecting member for bending an optical path at a position adjacent to the front lens unit, and a second reflecting member for bending the optical path at a position adjacent to the rear lens unit, and
wherein the following conditional expression is satisfied:

$$0.05 < Dout/Din < 0.50,$$

where Din is a distance between surface vertexes of lenses closest to an object in the two optical systems, and Dout is a distance between surface vertexes of lenses closest to an image plane in the two optical systems.

16. The imaging apparatus according to claim 15, wherein the optical images formed by the two optical systems are captured by the image sensor.

17. The imaging apparatus according to claim 15, wherein the following conditional expression is satisfied:

$$2.00 < fm/f < 20.00,$$

where, in the at least either one of the two optical systems, fm is a focal length of the intermediate lens unit, and f is a focal length of the at least either one of the two optical systems.

18. The imaging apparatus according to claim 15, wherein the following conditional expression is satisfied:

$$0.10 < |fn/fp| < 0.50,$$

where, in at least either one of the two optical systems, fn is a focal length of the front lens unit, and fp is a focal length of the rear lens unit.

19. The imaging apparatus according to claim 15, wherein the following conditional expression is satisfied:

$$0.10 < L1/L < 0.60,$$

where, in at least either one of the two optical systems, L1 is a distance on an optical axis from a surface closest to the object in the front lens unit to a reflecting surface of the first reflecting member, and L is a distance on the optical axis from the surface closest to the object in the front lens unit to the image plane.

20. The imaging apparatus according to claim 15, wherein the following conditional expression is satisfied:

$$0.10 < L2/L < 0.50,$$

where, in at least either one of the two optical systems, L2 is a distance on an optical axis from a reflecting surface of the second reflecting member to a surface closest to the image plane in the rear lens unit, and L is a distance on the optical axis from a surface closest to the object in the front lens unit to an image plane.

21. A lens apparatus comprising:
two optical systems,
wherein each of the two optical systems includes a front lens unit having negative refractive power, an intermediate lens unit, and a rear lens unit disposed in this order from an object side to an image plane side,
wherein each of the intermediate lens units in the two optical systems includes a first reflecting member for bending an optical path at a position adjacent to the front lens unit, and a second reflecting member for bending the optical path at a position adjacent to the rear lens unit,
wherein, in at least either one of the two optical systems, positive refractive power is provided between a reflecting surface of the first reflecting member and a reflecting surface of the second reflecting member, and
wherein the following conditional expression is satisfied:

$$0.05 < Dout/Din < 0.50,$$

where Din is a distance between surface vertexes of lenses closest to an object in the two optical systems, and Dout is a distance between surface vertexes of lenses closest to an image plane in the two optical systems.

22. An imaging apparatus comprising:
two optical systems; and
an image sensor configured to capture optical images formed by the two optical systems,
wherein each of the two optical systems includes a front lens unit having negative refractive power, an intermediate lens unit, and a rear lens unit disposed in this order from an object side to an image plane side,
wherein each of the intermediate lens units in the two optical systems includes a first reflecting member for bending an optical path at a position adjacent to the front lens unit, and a second reflecting member for bending the optical path at a position adjacent to the rear lens unit,
wherein, in at least either one of the two optical systems, positive refractive power is provided between a reflecting surface of the first reflecting member and a reflecting surface of the second reflecting member, and
wherein the following conditional expression is satisfied:

$$0.05 < Dout/Din < 0.50,$$

where Din is a distance between surface vertexes of lenses closest to an object in the two optical systems, and Dout is a distance between surface vertexes of lenses closest to an image plane in the two optical systems.

* * * * *